US010801464B2

(12) United States Patent
Luo et al.

(10) Patent No.: US 10,801,464 B2
(45) Date of Patent: Oct. 13, 2020

(54) MICROWAVE ENHANCED COMBUSTION WITH DYNAMIC FREQUENCY, POWER, AND TIMING CONTROL AND WITH TRANSMISSION COEFFICIENT FOR POWER FEEDBACK

(71) Applicant: Southwest Research Institute, San Antonio, TX (US)

(72) Inventors: Yilun Luo, Ann Arbor, MI (US); Scott R. Hotz, Pinckney, MI (US); Terrence F. Alger, San Antonio, TX (US); Robert T. Coppersmith, III, Pinckney, MI (US)

(73) Assignee: Southwest Research Institute, San Antonio, TX (US)

(*) Notice: Subject to any disclaimer, the term of this patent is extended or adjusted under 35 U.S.C. 154(b) by 136 days.

(21) Appl. No.: 16/169,186

(22) Filed: Oct. 24, 2018

(65) Prior Publication Data

US 2020/0132037 A1    Apr. 30, 2020

(51) Int. Cl.
*F02P 9/00* (2006.01)
*F23C 7/00* (2006.01)
*F02B 3/06* (2006.01)
*F02P 23/04* (2006.01)

(52) U.S. Cl.
CPC ............. *F02P 9/007* (2013.01); *F02B 3/06* (2013.01); *F02P 23/04* (2013.01); *F23C 7/004* (2013.01)

(58) Field of Classification Search
CPC ......... H01T 13/50; H01T 19/00; H01T 13/44; H05H 1/46; H05H 2001/463; H05H 1/52; H05H 2001/4607; F02M 27/042
See application file for complete search history.

(56) References Cited

U.S. PATENT DOCUMENTS

| 4,297,983 | A  | * | 11/1981 | Ward ..................... | F02P 23/04 |
|           |    |   |         |                           | 123/536 |
| 7,671,309 | B2 | * | 3/2010  | Kumar ................. | F02P 23/045 |
|           |    |   |         |                           | 123/1 R |
| 9,677,534 | B2 | * | 6/2017  | Ikeda ..................... | F02M 27/06 |
| 9,867,270 | B2 | * | 1/2018  | Ikeda .................... | F02P 23/045 |
| 9,964,094 | B2 | * | 5/2018  | Gallatz .................... | F02F 1/18 |
| 10,465,618 | B1 | * | 11/2019 | Luo ......................... | F02D 35/02 |
| 2020/0124018 | A1 | * | 4/2020 | Alger, II .................. | F02B 3/06 |

* cited by examiner

*Primary Examiner* — Carl C Staubach
(74) *Attorney, Agent, or Firm* — Livington Law Firm

(57) ABSTRACT

A system and method for generating microwaves for microwave enhanced combustion (MEC) input to an MEC antenna of an internal combustion engine. The system uses a microwave generator and a directional coupler, which delivers the MEC input signal to the MEC antenna and receives a reflected signal from the MEC antenna. A feedback path determines a desired frequency for the MEC input signal, based on the reflected signal, and also determines a power feedback correction value. An open loop path determines desired power and timing for the MEC input signal, based on various engine conditions. The desired power is corrected with the power feedback correction value.

12 Claims, 3 Drawing Sheets

$\Gamma = V_{REFLECTED}/V_{INCIDENT}$    EQ. 1
$\Gamma = -I_{REFLECTED}/I_{INCIDENT}$    EQ. 2
$Z = Z_0(1+\Gamma)/(1-\Gamma)$    EQ. 3

MICROWAVE ENHANCED COMBUSTION WITH DYNAMIC FREQUENCY, POWER, AND TIMING CONTROL AND WITH TRANSMISSION COEFFICIENT FOR POWER FEEDBACK

TECHNICAL FIELD OF THE INVENTION

This invention relates to internal combustion engines, and more particularly to microwave enhanced combustion.

BACKGROUND OF THE INVENTION

Recent research has shown a beneficial effect of microwave energy on the combustion processes of air-fuel mixtures. Microwave enhanced combustion (MEC) boosts combustion kinetics by accelerating flame electrons and creating radicals using microwave energy. MEC has demonstrated promising results in improving thermal efficiency and emissions for different engine platforms by improving flame speed, dilution tolerance, and combustion stability.

The MEC concept requires the combustion chamber to couple with the microwave energy field, leading to efficient energy transfer between the microwaves and the flame front as it travels across the chamber. This coupling is only achieved when the impedance of the microwave system matches the impedance of the combustion chamber.

As conventionally embodied, MEC transmits microwaves to the combustion flame only during the early combustion phase. After the first 3% to 5% of the combustion duration, around 90% of microwave energy is reflected to the transmitter before being emitted to flame. This large reflection limits MEC's ability to enhance combustion and causes device heating and potential damage.

The MEC reflection is caused by a radio frequency phenomenon known as impedance mismatch. To mitigate reflection, the impedance of the microwave transmitter should be matched to the impedance of the flame, which changes during combustion. In an internal combustion engine, an additional source of impedance variation comes from the changing volume of the combustion chamber due to the motion of the piston. Both sources of impedance variation can lead to an impedance mismatch.

Conventional MEC impedance matching devices are based on tuning screws or waveguide stubs, which are typically adjusted only before engine ignition. In addition, because the timing of the ignition event can change every engine cycle, and the optimal impedance match using conventional equipment can only occur at one fixed timing, it is difficult to ensure that an impedance mismatch will not occur in a running engine.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a control method to improve microwave enhanced combustion (MEC) by maximizing microwave transmission efficiency for the evolving flame based on electrical impedance within the combustion chamber. The method is based on the recognition that after ignition, as the in-cylinder air-fuel mixture transforms to flame, its impedance changes dramatically from insulative to dielectric/conductive, and that other changes occur within the combustion chamber. The impedance of the MEC transmitter is matched to the combustion chamber using a real-time feedback loop for frequency control. An open loop uses engine conditions for microwave power and timing control.

As stated in the Background, conventional MEC impedance matching is performed before engine combustion, and do not change impedance during combustion. In other words, conventional MEC mechanically sets an impedance matching device for one combustion condition, which remains static throughout engine operation. Furthermore, even if dynamic impedance matching were attempted, the mechanical devices that are used are not fast enough to match changing impedance within the cylinder. The inability of current MEC processes to match impedance during combustion significantly limits the microwave energy transmitted to combustion.

An MEC impedance matching process should account for at least three factors. A first factor is changes in impedance with different environmental conditions, such as altitude, fuel type, or temperature. A second factor is changes in impedance with different engine operating conditions, such as varying engine speed and load as set by the driver. A third factor is changes in impedance within the split-second period of combustion.

Figure 1:
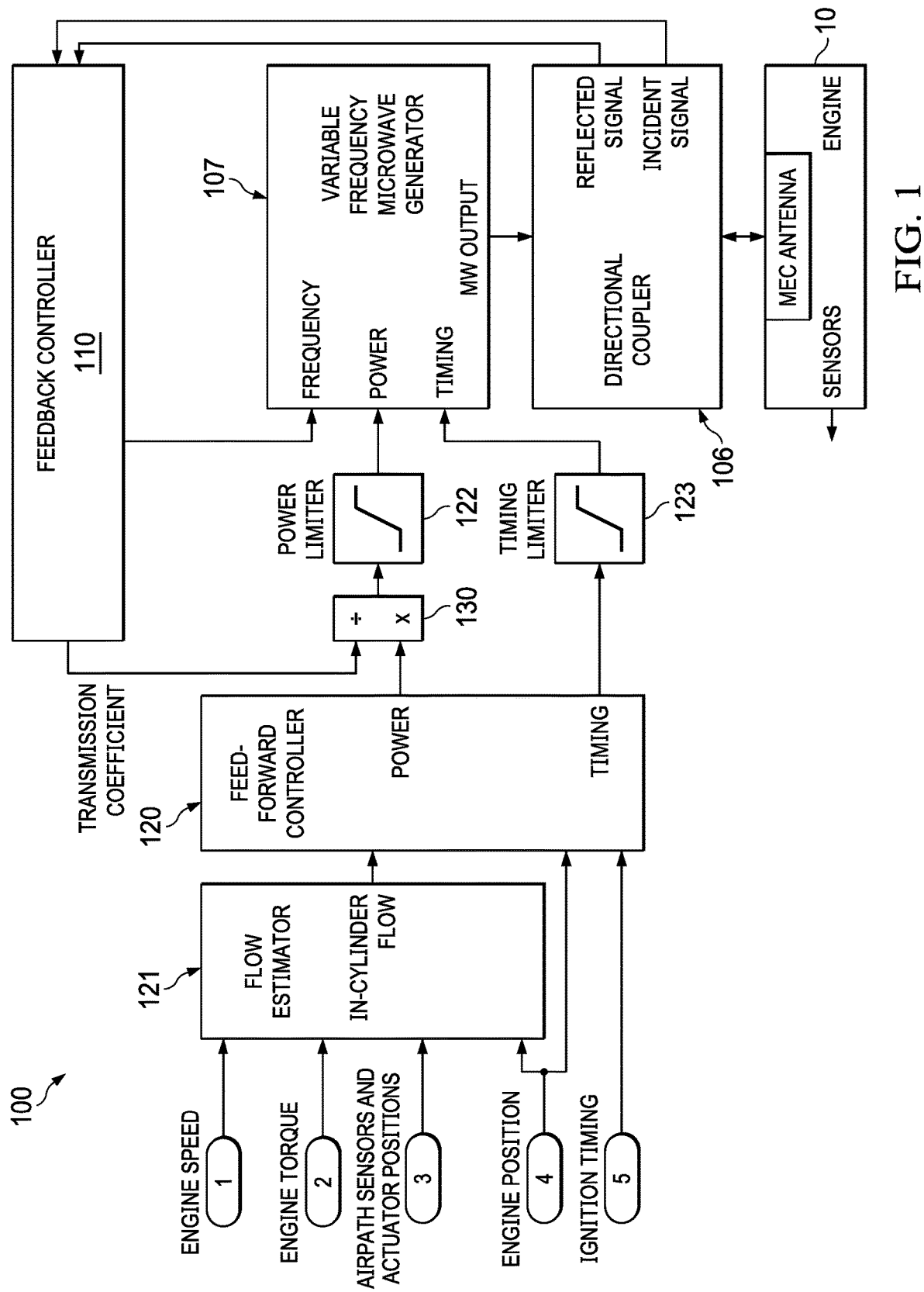
FIG. 1 illustrates an MEC control process in accordance with the invention.

FIG. 1 illustrates a microwave enhanced combustion (MEC) control system 100 with real-time frequency, power and timing control for a transmitted MEC signal. System 100 is assumed to have appropriate hardware and programming for the tasks described herein. It may be implemented within an engine control unit or as a separate device.

Engine 10 is an internal combustion engine, and is assumed to have an MEC antenna and various sensors for detecting engine conditions, as described herein. These engine conditions include at least engine position, and may also include engine speed, engine torque, ignition timing, and in-cylinder pressure and temperature. Sensors for other engine conditions such as airpath sensors, and actuator position sensors may also be used, with their data contributing to engine condition data as described herein.

Engine 10 may be any internal combustion engine, including gasoline, natural gas, dual fuel and diesel engines, burners and jet engines. It is assumed that engine has at least one combustion chamber, whose combustion conditions are referred to herein a "in-cylinder" conditions.

Feedback Path for Frequency Control

For frequency control of the MEC input signal, MEC control system 100 uses a feedback path with a feedback controller 110. A directional coupler 106 receives both the reflected signal from the MEC antenna and delivers the incident signal. It delivers the reflected signal to the frequency controller 110, which determines a desired frequency based on the reflected signal. As explained below, controller 110 operates such that changes in the reflected power result in changes of frequency of the delivered MEC microwave signal in order to minimize the reflected power.

The method described herein is performed on a continuous basis during operation of engine 10. The "current" values described below represent data acquired in real time as engine operating conditions may or may not change.

Figures 1A, 2:
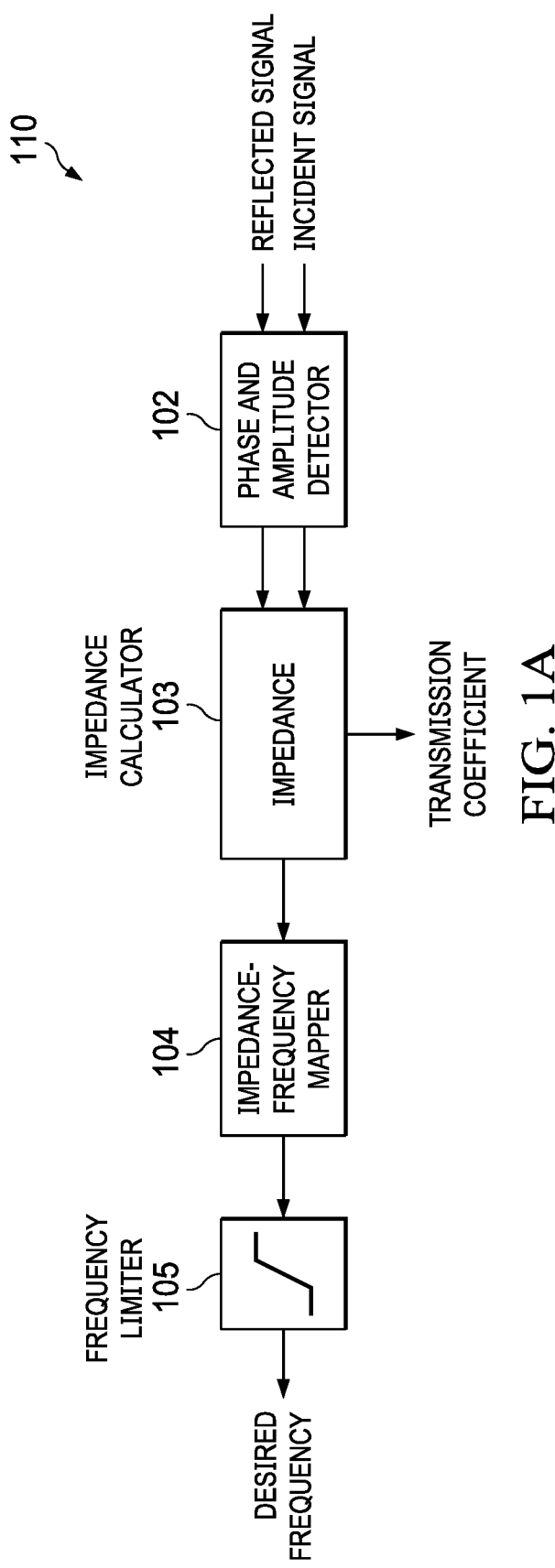
FIG. 1A illustrates the frequency controller of FIG. 1.
FIG. 2 illustrates how the impedance within the combustion chamber can be calculated from forward and reflected voltages and currents.

FIG. 1A illustrates feedback controller 110. A phase and amplitude detector 102 receives the reflected and incident signals from the MEC antenna via directional coupler 101. It uses these signals to determine phase and amplitude data associated both of these signals, and delivers this data to impedance calculator 102. Phase and amplitude detector 102 may be implemented with commercially available solid-state integrated circuit devices.

Impedance calculator 103 uses the phase and amplitude data to estimate the in-cylinder impedance. An impedance-frequency mapper 104 then matches this impedance to a feedback frequency term. The calculation of in-cylinder impedance and matching of in-cylinder impedance to frequency may be performed with various algorithms, models, or mappings designed to select a frequency that will minimize impedance mismatch. For example, a microwave model of the MEC antenna, combustion chamber, and flame could be constructed and used to calculate its impedance, which is then matched to a reflection-reducing frequency. Impedance-frequency mapper 104 may be implemented with a proportional-integral-derivative (PID) controller, or a fuzzy controller.

The output of the impedance-frequency mapper 104 is delivered to a frequency limiter 105. This limits the desired frequency to a frequency that is within the range of microwave generator 107. The result is the "desired frequency" for output from microwave generator 107.

The desired frequency is delivered to variable frequency microwave generator 107. Generator 107 generates microwaves in forms of continuous wave (CW) or pulses with its output frequency determined as described above. Generator 107 provides the microwave output to the MEC antenna of engine 10 via directional coupler 106.

FIG. 2 illustrates how the impedance of the flame and combustion can be calculated from the forward and reflected voltages or currents. In Equations 1-3, Z is the impedance of the flame and combustion, and $\Gamma$ is the reflection coefficient. $Z_0$ is the characteristic impedance of the transmission line, which typically remains constant over the operating frequency range. $V_{Reflected}$ and $V_{Incident}$ are the reflected and incident microwave voltage signals, respectively. $I_{Reflected}$ and $I_{Incident}$ are the reflected and incident microwave current signals, respectively. Their amplitudes and phases are measured by phase and amplitude detector 102 using microwave circuits, such as a quadrature amplitude modulation (QAM) demodulator.

Referring again to FIG. 1 and FIG. 1A, impedance calculator 103 also calculates a transmission coefficient, which is used as a correction term in determining the desired power for the MEC input signal. The feedback term is discussed below.

Feedforward Power and Timing Control Path

The power and timing of the MEC signal to be delivered to the MEC antenna are derived from an open-loop control path. Various engine conditions are used as input data to a feedforward controller 120, which receives the engine condition data and maps this data to desired power and desired timing values for delivery to the MEC microwave generator 107.

For MEC power control, open-loop control tables of controller 120 rapidly set the delivered power close to an optimum. For MEC timing control, timing for delivery of microwaves at the optimal moments for each combustion event achieves optimum MEC performance in the presence of changing engine and environmental conditions.

To reduce power consumption while maintaining performance, the MEC generator 107 could also generate microwaves in pulsed form. In this case, control system 100 determines pulse modulation, including pulse duration, pulse width, period and duty cycle.

The various inputs to controller 120 may be any combination of in-cylinder flow, engine position, and ignition timing. As explained below in connection with FIG. 3, additional data representing in-cylinder composition and density may also be estimated and input to controller 120. It is expected that at least engine position would be required as an input to controller 120.

For in-cylinder flow, a flow estimator 121 estimates in-cylinder flow from engine speed, engine torque, air flow, and engine position. Air flow data may be derived from various airpath sensors and actuator positions.

The power output of controller 120 is adjusted with a transmission coefficient from impedance calculator 103. This transmission coefficient is calculated from both incident and reflected power. An adjuster 130 corrects the desired power with an error value derived from the transmission coefficient.

A power limiter 122 may be used to ensure that the desired power is within the range of generator 107. Similarly, a timing limiter 123 may be used to ensure that the desired timing parameters are within the range of microwave generator 107. Generator 107 then generates microwaves with the desired frequency, power, and timing to the MEC antenna.

Figure 3:
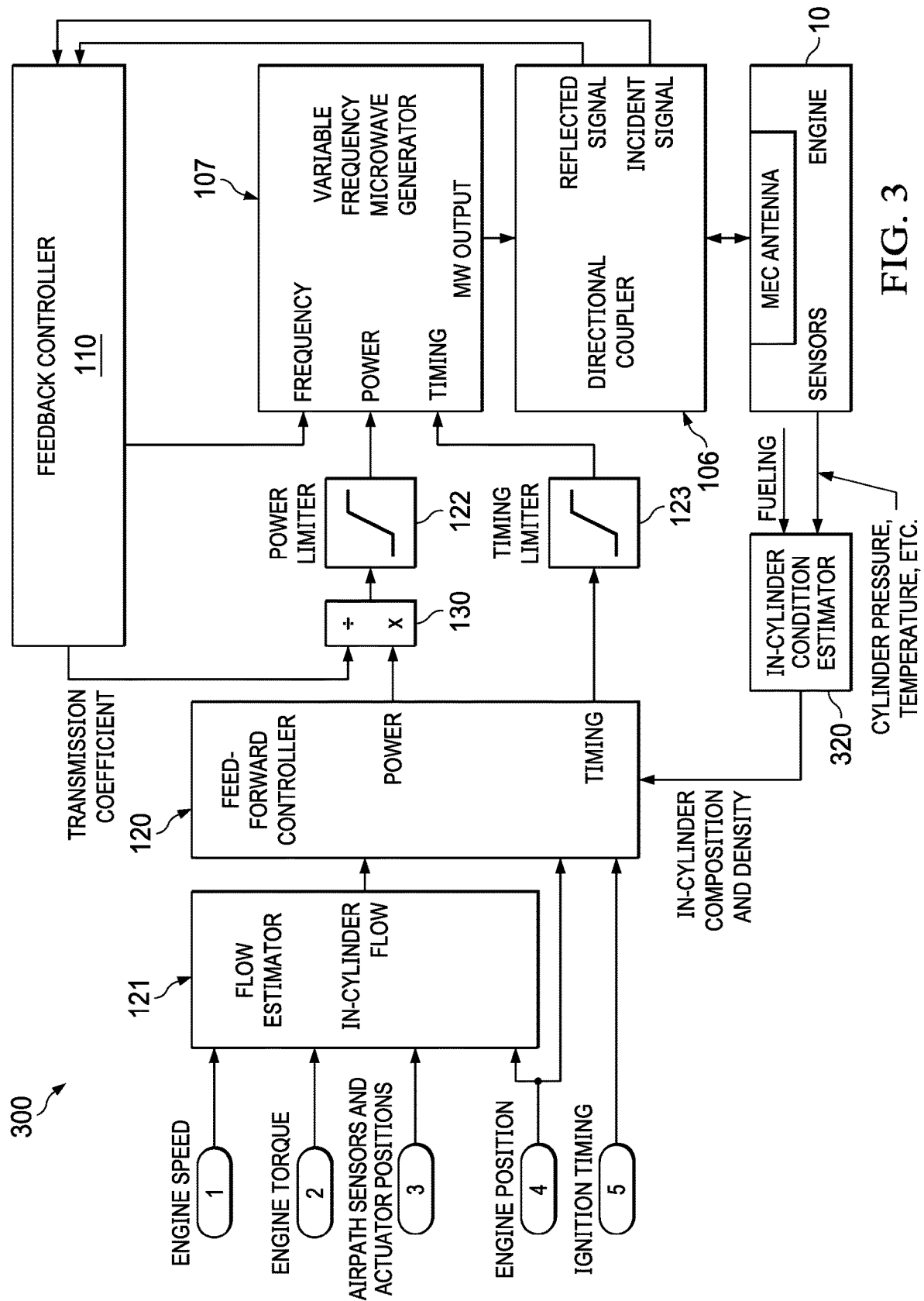
FIG. 3 illustrates the MEC control process of FIG. 1, with an additional process for estimating in-cylinder composition and density for input to the power control process.

FIG. 3 illustrates an MEC control system 300, which is the same as MEC control system 100, but with the addition of an additional in-cylinder condition estimator 320 for estimating in-cylinder composition and density. This composition and density data is then used as additional input to feedforward controller 120.

In-cylinder condition estimator 320 receives input such as cylinder pressure and cylinder temperature from appropriate sensors installed in engine 10. Current fueling mass input may be received from the engine's fueling controller. The output of process 320 is data representing in-cylinder composition and density.

Control System Calibration

Referring to both FIGS. 1 and 2, the mapping processes 120 and 320 can be calibrated from MEC experiments on dynamometers at different engine and environmental conditions. The calibration process is compatible with industry-standard engine calibration process for other types of engine control. For each engine operating point (steady-state), the microwave frequency, power, timing and pulsing are calibrated respectively, and then co-optimized together to find the best combination for combustion performance. Data from sensors, actuators and test cell instruments are recorded and processed to obtain the control tables. The estimator for in-cylinder conditions (composition, density and flow, etc.) is derived based on combustion, microwave models, and is calibrated from the data and simulation studies, such as CFD, combustion, RF and plasma simulations. Finally, the calibration process is carried out to optimize MEC for transient operating conditions.

What is claimed is:

1. A system for generating microwaves for microwave enhanced combustion (MEC) input to an MEC antenna of an internal combustion engine, the internal combustion engine further having at least one combustion cylinder, comprising:
   a microwave generator configured to generate an incident signal, the incident signal having a desired frequency and desired power;
   a directional coupler for delivering the incident signal to the MEC antenna and for receiving a reflected signal from the MEC antenna;
   a feedback path comprising a feedback controller configured to receive the incident signal and the reflected signal from the directional coupler, to estimate impedance within the cylinder, to match the impedance to a desired frequency value, to deliver the desired frequency value to the microwave generator, and to calculate a transmission coefficient; an open loop control path comprising a feedforward controller that receives engine data and matches the engine data to a desired power;
   wherein the engine data comprises at least one or more of the following engine conditions: engine position or ignition timing; and
   a desired power adjuster configured to correct the desired power with a correction value derived from the transmission coefficient, thereby producing a corrected desired power, and to deliver the corrected desired power to the microwave generator.

2. The system of claim 1, further comprising a flow estimator for estimating in-cylinder flow, based on one or more of the following parameters: engine speed, engine torque, air path data, and engine position; and wherein the engine data further comprises in-cylinder flow data.

3. The system of claim 1, wherein the incident signal further has one or more desired timing parameters, and wherein the feedforward controller is further configured to determine at least one timing parameter based on the engine data.

4. The system of claim 3, wherein the incident signal is a pulsed signal and the timing parameter is at least one of: pulse width or duty cycle.

5. The system of claim 1, wherein the open loop control path further comprises an in-cylinder estimator configured to receive in-cylinder data, to estimate in-cylinder composition and density data, and to deliver the in-cylinder composition and density data to the controller, and wherein the engine data further comprises in-cylinder composition and density.

6. The system of claim 5, wherein the in-cylinder data comprises at least cylinder pressure or cylinder temperature.

7. A method for generating microwaves for microwave enhanced combustion (MEC) input to an MEC antenna of an internal combustion engine, the internal combustion engine further having at least one combustion cylinder, comprising:
   using a microwave generator to generate an incident signal, the incident signal having a desired frequency and desired power;
   using a directional coupler to deliver the incident signal to the MEC antenna and for receiving a reflected signal from the MEC antenna;
   determining the desired frequency by using the incident signal and reflected signal to estimate impedance within the cylinder, and matching the impedance to a desired frequency value;
   determining the desired power by matching engine data to a desired power, wherein the engine data comprises at least one or more of the following engine conditions: engine position or ignition timing; and
   adjusting the desired power with a correction value derived from a transmission coefficient calculated from the incident signal and reflected signal.

8. The method of claim 7, further comprising estimating in-cylinder flow, based on one or more of the following parameters: engine speed, engine torque, air path data, and engine position; and wherein the engine data further comprises in-cylinder flow data.

9. The method of claim 7, wherein the incident signal further has one or more desired timing parameters, and further comprising determining at least one timing parameter by matching engine data to the desired timing parameter.

10. The method of claim 9, wherein the incident signal is a pulsed signal and the timing parameter is at least one of: pulse width or duty cycle.

11. The method of claim 7, further comprising estimating in-cylinder composition and density data, and wherein the engine data further comprises in-cylinder composition and density.

12. The method of claim 11, wherein the in-cylinder data comprises at least cylinder pressure or cylinder temperature.

* * * * *